United States Patent
Owusu

(10) Patent No.: US 7,396,579 B2
(45) Date of Patent: Jul. 8, 2008

(54) FLUORESCENT RED-ORANGE RETROREFLECTIVE SHEETING

(75) Inventor: Osei A. Owusu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 316 days.

(21) Appl. No.: 10/438,952

(22) Filed: May 15, 2003

(65) Prior Publication Data

US 2004/0227997 A1    Nov. 18, 2004

(51) Int. Cl.
*B32B 3/00* (2006.01)
*G02B 5/124* (2006.01)

(52) U.S. Cl. ............... 428/172; 428/143; 428/166; 428/207; 428/690; 359/529; 359/530

(58) Field of Classification Search ............ 428/143, 428/166, 172, 207, 690, 917; 359/529, 530
See application file for complete search history.

(56) References Cited

U.S. PATENT DOCUMENTS

| | | | |
|---|---|---|---|
| 2,407,680 A | 9/1946 | Palmquist et al. | |
| 3,190,178 A | 6/1965 | McKenzie | |
| 3,684,348 A | 8/1972 | Rowland | |
| 4,025,159 A | 5/1977 | McGrath | |
| 4,443,226 A | 4/1984 | Röhser | |
| 4,511,210 A | 4/1985 | Tung et al. | |
| 4,801,193 A | 1/1989 | Martin | |
| 4,895,428 A | 1/1990 | Nelson et al. | |
| 4,896,428 A | 1/1990 | Peterson | |
| 4,896,943 A | 1/1990 | Tolliver et al. | |
| 4,938,563 A | 7/1990 | Nelson et al. | |
| 4,950,525 A | 8/1990 | Bailey | |
| 5,064,272 A | 11/1991 | Bailey et al. | |
| 5,066,098 A | 11/1991 | Kult et al. | |
| 5,272,562 A * | 12/1993 | Coderre | 359/529 |
| 5,691,846 A | 11/1997 | Benson, Jr. et al. | |
| 5,754,337 A * | 5/1998 | Burns et al. | 359/515 |
| 5,920,429 A | 7/1999 | Burns et al. | |
| 6,110,566 A | 8/2000 | White et al. | |
| 6,312,132 B1 | 11/2001 | Pavelka et al. | |
| 6,406,798 B2 | 6/2002 | White et al. | |

(Continued)

FOREIGN PATENT DOCUMENTS

| | | |
|---|---|---|
| WO | WO 97/37252 | 10/1997 |
| WO | WO 02/22761 A1 | 3/2002 |
| WO | WO 02/43952 A1 | 6/2002 |
| WO | WO 03/016391 | 2/2003 |

(Continued)

OTHER PUBLICATIONS

American National Standard for High-Visibility Safety Apparel, ANSI/ISEA 107-1999, pp. 11-12 (1999).

(Continued)

*Primary Examiner*—Donald J. Loney

(57) ABSTRACT

A fluorescent red-orange retroreflective article includes a polymeric matrix and at least one fluorescent dye added in an amount that provides the article with a red-orange color under daytime lighting conditions. The article also includes cube corner elements disposed at a back side of the polymeric matrix. The article can exhibit a retroreflectivity of at least 350 or 500 cd/(lux·m$^2$), and a brightness Y of at least 20, 30, or 35. The article can exhibit a color within a preferred red-orange color space bounded by CIE chromaticity coordinates (0.560, 0.380), (0.580, 0.355), (0.633, 0.366) and (0.610, 0.390).

15 Claims, 3 Drawing Sheets

U.S. PATENT DOCUMENTS

| | | | |
|---|---|---|---|
| 6,526,588 B2 | 3/2003 | White et al. | |
| 6,531,205 B1 * | 3/2003 | Buoni et al. | 428/156 |
| 6,533,961 B2 | 3/2003 | Harelstad et al. | |
| 6,841,236 B2 | 1/2005 | Pavelka et al. | |

FOREIGN PATENT DOCUMENTS

| | | |
|---|---|---|
| WO | WO 03/016406 | 2/2003 |
| WO | WO 03/016407 | 2/2003 |

OTHER PUBLICATIONS

3M Scotchlite™ Reflective Material High Gloss Film Product Sample Sheet (2001).

3M Scotchlite™ Reflective Material High Gloss Trim Product Sample Sheet (2002).

13-3398 Hostasol® Red 5B Clariant Corporation, Nov. 2, 2000.

13-3399 Hostasol® Red GG Clariant Corporation, Nov. 2, 2000.

11-5100 Hostasol® Yellow 3G Clariant Corporation, Nov. 2, 2000.

Specification for High-visibility warning clothing, BSI (1994).

Wiley-VCH, Wiley InterScience Success Table of Contents, Naphthalimide Dyes and Pigments, Ullmann's Encyclopedia of Industrial Chemistry, Sixth Edition, Jun. 2001.

Fluooresence Red 5B, Hong Yu Chemical Co., Ltd., 2002.

* cited by examiner

FLUORESCENT RED-ORANGE RETROREFLECTIVE SHEETING

BACKGROUND

The present invention relates to retroreflective sheeting, and more particularly to such sheeting that exhibits a fluorescent red-orange color.

It is known that fluorescent colors can provide increased conspicuity, particularly under low natural lighting conditions. Fluorescent colors provide enhanced conspicuity because the visual contrast that fluorescent colors create with the environment is greater than non-fluorescent articles. High visibility products such as traffic signs and the like have been manufactured which employ fluorescent yellow and red colors.

High visibility is also desirable for safety apparel, such as rainwear, coveralls, outerwear, polar shirts, and high visibility vests, and for other high visibility applications such as temporary road signs and the like. These products require a compliant high gloss reflective sheeting, with a red-orange color. Fluorescent red-orange is defined by the CIE 1931 standard colorimetric system as falling within a range of chromaticity coordinates (x, y) defined by (0.610, 0.390), (0.535, 0.375), (0.570, 0.340) and (0.655, 0.344) according to the American National Standards Institute (ANSI) standard for high-visibility safety apparel and the European high visibility standard EN471.

Despite the desirability of fluorescent red-orange apparel and signs for increased visibility and safety, a true fluorescent red-orange product with acceptable brightness and retroreflectivity properties has been difficult to formulate. Current products for safety apparel that fall within the fluorescent red-orange color range are products sold by 3M Company of St. Paul, Minn. as 3M™ Scotchlite™ Reflective Material High Gloss Trim (and High Gloss Film), as well as a blaze-orange product manufactured by Reflexite Corporation of Avon, Conn. and W-7514 Fluorescent Orange retroreflective sheeting manufactured by Avery-Dennison Corporation of Pasadena, Calif. While these products fall within the red-orange color coordinates, they tend to suffer from an unimpressive level of retroreflectivity, daytime brightness, or a combination thereof. A red-orange retroreflective product that can provide greater brightness and retroreflectivity would be a substantial advancement to the state of the art.

BRIEF SUMMARY

Discussed herein are fluorescent red-orange retroreflective articles made up of a polymeric matrix and at least one fluorescent dye added to the polymeric matrix such that the color of the article is within a preferential portion of the standard red-orange color region. The preferential portion is situated in the upper right part of the red-orange color region, preferably defined by CIE chromaticity corner points (0.580, 0.384), (0.6023, 0.360), (0.633, 0.366) and (0.610, 0.390). The articles can achieve a good balance of high brightness and high retroreflectivity. Specifically, the articles can achieve a luminance factor (brightness, or cap Y) of at least 20 and an average retroreflectivity of at least 350 cd/(lux·m$^2$). More preferably, the articles achieve a luminance factor of at least 30 and an average retroreflectivity of at least 500 cd/(lux·m$^2$).

The above brief summary is provided for convenience but should not be construed as limiting the scope of the present invention in any way, which scope is set forth in the claims appended hereto, as may be amended during prosecution.

BRIEF DESCRIPTION OF THE DRAWINGS

In the figures, elements identified by the same reference number represent the same or similar element.

DETAILED DESCRIPTION

In describing aspects of the invention certain terms will have the meanings defined herein.

"CIE" refers to the Commission International de l'Eclairage (International Commission on Lighting) which is the responsible body for international recommendations for photometry and colorimetry.

Figure 1:
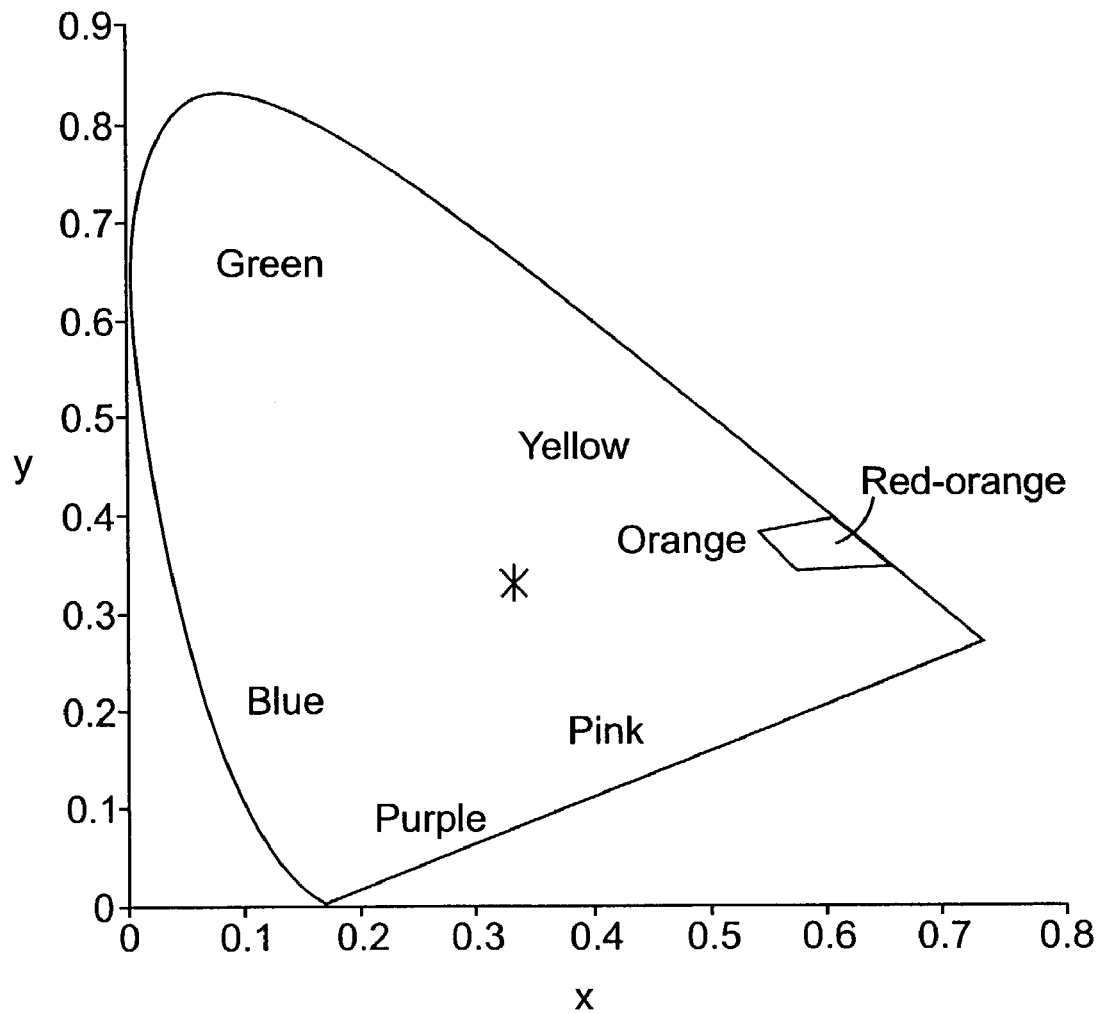
FIG. 1 is a CIE 1931 x, y chromaticity diagram showing areas within the diagram generally representing various color spaces.

"CIE chromaticity diagram" or "x, y diagram" refers to a two-dimensional diagram in which points specified by chromaticity coordinates (x, y) represent the chromaticities of color stimuli in the CIE color matching system, as is known in the art. FIG. 1 shows the 1931 CIE x, y chromaticity diagram with standard color regions identified. The "color" (or "chromaticity" or "chromaticity coordinates") of an article can thus be precisely measured or specified by a point or region (expressed in terms of one or more chromaticity coordinates (x,y)) on the CIE chromaticity diagram, using the CIE 1931 standard colorimetric system. This system uses a CIE Standard Illuminant D65 and a 0°/45° geometry (illumination along a direction coincident with the surface normal axis (0°) and detection along a direction 45° from the surface normal axis), thus simulating normal daytime illumination and observation conditions. Unless otherwise noted, this convention for specifying color is adhered to herein.

"Luminance factor" is a measure of the perceived brightness of an article under normal daytime illumination and observation conditions. This factor is expressed herein as the well-known CIE tristimulus value "Y" for the article. The luminance factor Y is the second of three CIE tristimulus values (X,Y,Z) representing the amounts of three primary colors that specify a color stimulus. Tristimulus values can be calculated from the spectral power density of light eminating from a sample using the above-mentioned CIE Standard Illuminant D65 and 0°/45° measurement geometry.

"Fluorescence" refers to luminescence that is caused by the absorption of radiation at one wavelength followed by nearly immediate re-radiation at a different wavelength.

"Retroreflective" refers to a surface or article that returns a substantial portion of incident light back in the direction of the source of illumination over a wide range of incidence angles. The degree to which a surface is retroreflective is then referred to as its coefficient of retroreflection ("$R_A$") or simply as its retroreflectivity. Retroreflectivity is expressed in units of candelas per lux per square meter (cd/(lux·m$^2$)), and unless otherwise noted is measured with a −4° entrance angle and a 0.2° observation angle. For many retroreflective surfaces, particularly those made with prismatic cube corner elements, the retroreflectivity can change as a function of the rotation of the surface in question about an axis perpendicular to the surface (such rotation, in the case of a flat surface, maintains the surface in a fixed geometric plane). As a result, the "average retroreflectivity" (or "average $R_A$") reported herein is an average of two retroreflectivity measurements: the first measurement is taken with the sample rotated about a surface normal axis in an amount that produces a maximum value for $R_A$; and the second measurement is taken with the sample rotated 90° about the surface normal axis relative to the sample's orientation for the first measurement. Of course, these first and second measurements evaluate or test the same bounded physical area on the sample.

FIG. 1 is a CIE 1931 x, y chromaticity diagram identifying various color regions. The area within the "Red-Orange" color space is defined by CIE (x, y) chromaticity coordinates (0.610, 0.390), (0.535, 0.375), (0.570, 0.340) and (0.655, 0.344), as is known in the art. In the diagram, the asterisk represents the white color of the D65 illumination source.

Figure 2:
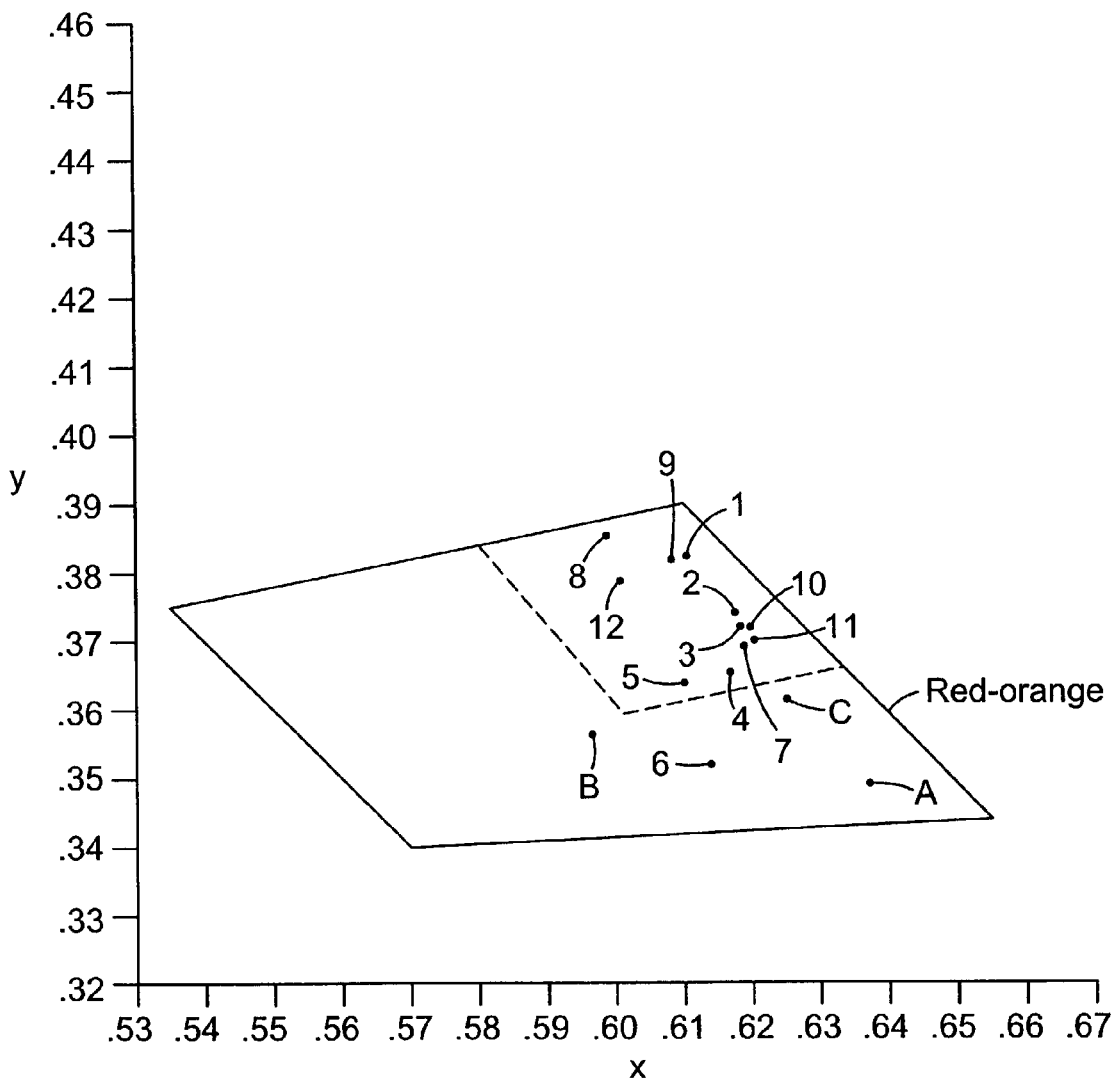
FIG. 2 is a CIE 1931 x, y chromaticity diagram showing the standard red-orange color space, a preferred portion of the red-orange color space, and points representing samples measured and described herein.

FIG. 2 is a close-up view of a portion of FIG. 1 defining the red-orange area of color space within the coordinate ranges noted above. Also shown in FIG. 2, however, are the measured chromaticity coordinates for the prior art products 3M™ Scotchlite™ High Gloss Trim (Series 6186) sold by 3M Company of St. Paul, Minn. (designated as A), a "blaze-orange" sheeting product sold by Reflexite Corporation of Avon, Connecticut (designated as B), and a W-7514 Fluorescent Orange retroreflective sheeting product sold by Avery-Dennison Corporation of Pasadena, Calif. (designated as C). In addition, the chromaticity coordinates of each of the examples (discussed in detail below) are shown, designated by example number, along with the boundaries of a preferred color space subset, also discussed below.

The present application discloses fluorescent red-orange retroreflective articles having selected dye compositions dispersed in a polymer matrix. The articles can be made by extruding a mixture of an effective color forming amount of the dye mixture and polymer to form a sheet. Retroreflective elements such as cube corner elements can be applied to or formed in the sheet to make the construction retroreflective. Suitable dye compositions, levels, and combinations are disclosed that can yield a fluorescent red-orange retroreflector exhibiting both a good level of average retroreflectivity (at least 350 cd/(lux·m$^2$), more preferably at least 500 cd/(lux·m$^2$)) and a good level of daytime brightness (a luminance factor Y of at least 20, more preferably at least 30 or even 35). The dye conditions associated with such enhanced performance tend to correspond to a particular preferential color space that is a subset of the overall red-orange fluorescent color space. In particular, the preferential color space is defined by CIE chromaticity coordinates (0.580, 0.384), (0.610, 0.390), (0.633, 0.366) and (0.6023, 0.360).

For preferred dyes, polymers, and film conditions, the dye concentration typically ranges from 0.08 to 5 percent weight (wt %), more preferably 0.08 to 3 wt %, and most preferably 0.08 to 1 wt % based on the weight of the polymer. However, for a given film thickness and dye composition, higher dye loading percentages tend to decrease the luminance factor of the fluorescent article, and thus it is preferable to achieve the desired color characteristics with as low of a percent weight of dye as possible. The appropriate dye loading percentages will also depend on the thickness of the film in which the dye is loaded and the dye composition.

There are a number of suitable dye combinations capable of achieving fluorescent red-orange articles having the aforementioned particular optical properties. Illustrative commercially available dyes that may be used include thioxanthene dyes such as HOSTASOL7 Red GG and HOSTASOL7 Yellow 3G, a thioindigo dye such as HOSTASOL7 Red 5B, and a perylene dye such as LUMOGEN7 Red F 300. HOSTA-SOL7 Red GG (also known as C. I. Solvent Orange 63) is an orange fluorescent dye chemically described as 14H-anthra92,1,9-mna] thioxanthene-14-one, commercially available from Clariant Corporation of Muttenz, Switzerland. HOSTASOL7 Yellow 3G (also known as C. I. Solvent Yellow 98) is a yellow fluorescent dye chemically described as N-octadecyl-benzo[k, 1 ]thioxanthene-3,4-dicarboximide, commercially available from Clariant Corporation of Muttenz, Switzerland. HOSTASOL7 Red SB (also known as C. I. Vat Red 41) is a red fluorescent dye chemically described as 3-(dimethylamino)-propyl bromide, commercially available from Clariant Corporation of Muttenz, Switzerland. LUMOGEN7 Red F 300 is a red fluorescent perylene dye that is commercially available from BASF AG of Ludwigshafen, Germany. Examples of specifically formulated and tested dye mixtures are given below.

The polymer matrix comprises a thermoplastic or thermoset resin. Suitable resins include a polymer or copolymer that can be formed into an article. Suitable polymers include plasticized and unplasticized polyvinyl chloride (PVC), polyester, unsaturated polyesters, polycarbonate, polyolefin, polyurethane, polyacrylate, or polymethylmethacrylate polymers and copolymers. The polymer can be in the form of a powder, pellet or bead into which the dye can be suitably uniformly dispersed.

Suitable polymethylmethacrylate polymers include impact modified grade polymers commercially available under the trade designation "ACP 923" from ICI Acrylics, Cordova, Tenn., medium grade impact modified polymethylmethacrylate commercially available under the trade designation "PLEXIGLAS MI-7" and polymethylmethacrylate commercially available under the trade designation "PLEXIGLAS V825" both from Atofina Chemicals, Philadelphia, Pa.

Suitable polycarbonate resins include bisphenol, a polycarbonate commercially available under the trade designations "FCR-2407" from Bayer Corp., Pittsburgh Pa., "LEXAN 123R" from General Electric Company, Schenectady, N.Y. or "CALIBRE 300 EP" from Dow Chemical Co., Midland, Mich.

Suitable polyolefin polymers include resins commercially available under the trade designation "BYNEL 3100" series resins from DuPont Co., Wilmington, Del.

The selection of a resin for a particular use will depend on variables such as the effect of the resin on the color properties of the extruded sheet, ease of processing into an article, and physical properties of the article such as flexibility, impact resistance, elongation and the like. Suitable resins will not adversely affect the color, brightness, or retroreflectivity of the article. A person of ordinary skill in the art can readily measure these properties by methods described herein or by methods described in compilations of methods such as those published by the American Society of Testing Materials (ASTM) and the American National Standards Institute (ANSI).

Fluorescent articles contemplated herein can be in any form and are preferably in the form of a sheet or film. An article can be prepared from the polymer and dye mixture by compression molding, casting, calendaring, extruding and the like as well understood in the art. In an embodiment where the article is a sheet or film, the thickness of the sheet is typically 0.02 mm to 1.0 mm or more preferably 0.02 mm to 0.2 mm. Exemplary sheet embodiments have cube-corner retroreflective elements disposed on a back side of the fluorescent red-orange dyed sheet, such that light that is retroreflected passes through the thickness of the colored film two times. In such embodiment, the cube corner elements preferentially have air-exposed facets (rather than a metal vapor coat), and a white seal film is provided behind the cube corner elements.

Exemplary retroreflective materials include a monolayer of small prismatic cube corner elements that are effective to redirect incident light back towards the source of illumination. A wide variety of specific designs of such materials are well known to those of skill in the art. The cube corner elements can be formed on one side of a unitary dyed sheet, or they can be formed from a separate material and attached, bonded, or otherwise secured to a dyed sheet. Representative retroreflective articles are described, for example, in U.S. Pat. Nos. 2,407,680; 4,511,210; 4,950,525; 3,190,178; 4,025,159; 4,896,943; 5,064,272; 5,066,098; 3,684,348; 4,801,193; 4,895,428; 4,938,563; and 5,691,846.

An exemplary line of cube corner retroreflective sheeting products are commercially available under the trade designation 3M™ Scotchlite™ High Gloss Reflective Material, from 3M Company, St. Paul, Minn.

A protective layer or overlay also may be applied to the fluorescent sheet to form an exterior (front) side to the laminate. The overlay can be made from the same polymeric resin as the fluorescent sheet, or from a different resin. The overlay can be transparent to visible light and can contain UV light absorbing materials to protect the laminate from the adverse effect of exposure to sunlight. UV light absorbing materials include benzotriazoles such as those available under the trade designation "TINUVIN 327" from Ciba Specialty Chemicals, benzophenones such as those available under the trade designation "CYASORB 531" or triazines such as those available under the trade designation "CYASORB UV 1164" which are commercially available from Cytec Industries, West Patterson N.J. The overlay can also protect the laminate from deleterious effects of weather, ozone, abrasive agents, and other environmental factors. The overlay can be attached to the remainder of the fluorescent article by an adhesive or by co-extrusion during formation of the fluorescent article.

In exemplary embodiments, the fluorescent red-orange sheet or film is a component of a retroreflective sheeting or material. For example, the article may be substituted for a traditional layer of the sheeting or material. The polymer matrix and dye may be included as part of the optical elements of the retroreflective sheeting, or may be included in an overlay film that is laminated to the optical elements of the retroreflective sheeting. The retroreflective sheeting may comprise optical elements, for example, microreplicated elements such as cube corner elements; and at least one additional layer, for example, as described in any of U.S. Pat. Nos. 2,407,680; 4,511,210; 4,950,525; 3,190,178; 4,025,159; 4,896,943; 5,064,272; 5,066,098; 3,684,348; 4,801,193; 4,895,428; and 4,938,563, which additional layer can comprise a polymer matrix and dye(s). Such additional layers can include a binder layer for the elements, an overlay or top film, and a seal film. A seal film can be applied to the array of cube corner elements in a chain-link pattern or other closed polygonal pattern, typically by RF, ultrasonic, patterned epoxy, hot can, or other known sealing technique so as to create a multiplicity of sealed cells that protect the facets of the cube corner elements from contamination by water, dirt, and the like. Retroreflective sheeting or material can be prepared as understood in the above-referenced patents as well as in accordance with the description herein for preparing the fluorescent article.

Figure 3:
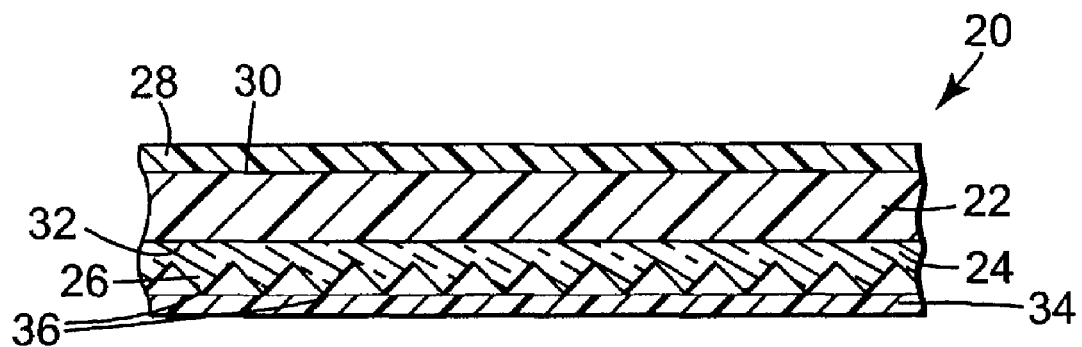
FIG. 3 is a cross sectional illustration of a portion of one embodiment of a red-orange retroreflective sheeting.

In FIG. 3, a retroreflective sheeting 20 includes a fluorescent layer 22 and a retroreflective layer 24 having cube corner retroreflective elements 26 formed therein. Fluorescent layer 22 has a protective overlay 28 applied to a front surface 30 opposite a rear surface 32 having cube corner retroreflective elements 26. Seal film 34 is positioned over protruding corners 36 of cube corner retroreflective elements 26 and joined to retroreflective layer 24 in a pattern of closed cells (not shown) to seal the cube corner retroreflective elements 26 in an air or other gaseous environment. Seal film 34 helps maintain an air interface at the facets of cube corner retroreflective elements 26 to preserve total internal reflection at such facets for efficient retroreflection. Seal film 34 may be heat sealed, adhesively bonded, radio frequency (RF) welded or ultrasonically welded to retroreflective layer 24 in an intermittent pattern that provides hermetically sealed cells, as discussed above. Seal film 34 can also, if appropriately pigmented such as with $TiO_2$ particulate, provide a uniform white backing to further enhance the brightness of the construction. Retroreflective sheeting 20 may be secured to an article such as high visibility apparel by sewing or other known attachment techniques.

Figure 4:
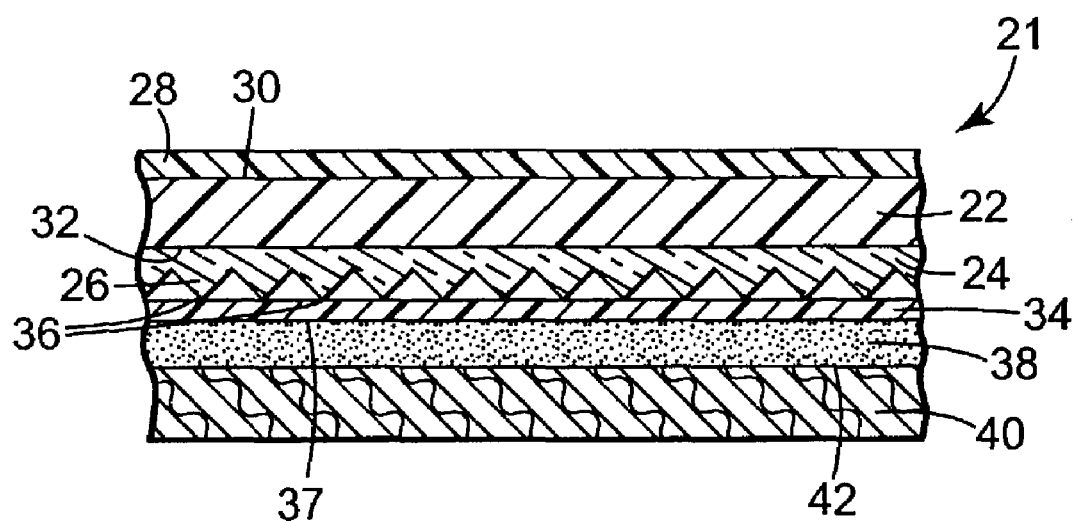
FIG. 4 is a cross sectional illustration of a portion of another embodiment of a red-orange retroreflective sheeting.

FIG. 4 shows another retroreflective sheeting embodiment 21, wherein retroreflective sheeting 20 from FIG. 3 is used to form a laminate having an adhesive backing. Surface 37 of seal film 34 is placed in contact with adhesive layer 38 on support layer 40. Support layer 40 may be, for example, paper, polyester or polyolefin and preferably has a release coating (not shown) such as a silicone release agent on surface 42 in contact with adhesive 38. Support layer 40 may be stripped from the sheeting 21 leaving adhesive 38 on surface 36 of film 34 prior to affixing the sheeting to a support (not shown).

EXAMPLES

The following examples show the color, brightness, and retroreflectivity of prior art red-orange retroreflective products as well as other retroreflective sheeting embodiments disclosed herein. The articles of Examples 1-11 were formed by mixing dyes into plasticized polyvinyl chloride (PVC) using a mixing head available from C.W. Brabender Instruments, Inc. of South Hackensack, N.J. at a rotor speed of 100 revolutions per minute (rpm). Unless otherwise noted, the total amount of dye in the blend of each of the examples was 0.1 wt %. The mixture was then pressed into films approximately 0.25 mm thick, using a hydraulic press whose platens had been heated to 180° C. The pressed films were immediately placed between water-cooled platens in a second press, and under pressure to quench the films. An array of cube corner elements was then formed on one major surface of the produced film by a casting and curing process, the cube corner elements having the same size, geometry, and composition as those found in conventional 3M™ Scotchlite™ High Gloss Reflective Material available from 3M Company of St. Paul, Minn. The cube corner elements are pyramid structures made of a clear blend of multifunctional acrylate, as described in U.S. Pat. No. 5,691,846 (Benson, Jr. et al.). The facets of the cube corner elements were exposed to air, i.e., no aluminum vapor coat was applied to the cube corner elements.

The color (in CIE chromaticity coordinates) and brightness (the luminance factor, Y) of each sample was measured using a Labsphere BFC-450 Bispectral Fluorescence Colorimeter having two monochrometers with standard illuminant D65 at 0/45 measurement geometry. Each of the prior art samples, as well as numbered Example 12, had a backing film (such as a seal film) disposed behind the cube corner elements. For numbered Examples 1-11, a 0.25 mm (0.010 inch) thick white plasticized polyvinyl chloride film—identical to the white seal film used in the 3M™ Scotchlite™ Reflective Material High Gloss Trim (Series 6186) product—was placed behind the cube corner elements (but was not bonded thereto) during the color and brightness measurements to simulate the presence of a white seal film. The retroreflectivity ($R_A$, in candelas per lux per square meter) was measured using an RM-2 spectrometer. The testing arrangement for color and brightness measurements, as well as the testing arrangement for the retroreflectivity measurement, used a 1-inch (25.4 mm) diameter spot size for the area under test for each sample.

Prior Art

3M™ Scotchlite™ Reflective Material High Gloss Trim (Series 6186), which is sold by 3M Company of St. Paul, Minn., was obtained. The product includes a 0.25 mm (0.010 inch) thick plasticized PVC layer, which contains 0.6 weight % of a single fluorescent dye, Rhodamine B. The product also includes the white seal film described above disposed behind the cube corner elements and joined to the cube corner element layer in a geometric pattern of seal lines. The geometric pattern was big enough to permit the 1-inch sampling area for the optical measurements to be positioned to avoid overlap with these seal lines. The sample was found to have the following properties:

3M ™ SCOTCHLITE ™ REFLECTIVE MATERIAL HIGH GLOSS TRIM (6186)

| Average $R_a$ (cd/lux/m²) | Luminance Factor (Y) | CIE Color Coordinates |
| --- | --- | --- |
| 163 | 34.8 | 0.6367, 0.3494 |

The blaze-orange product sold by Reflexite Corporation of Avon, Connecticut was obtained. This product had a front or top substantially clear (colorless) portion comprising retroreflective cube corner elements, and an orange-colored seal film disposed behind the cube corner elements and joined to the cube corner elements in a geometric pattern of seal lines. Thus, even though the product had a red-orange daytime appearance as a result of the orange seal film, retroreflected light was substantially white, unlike the other two prior art samples tested and unlike the numbered examples. The geometric pattern of seal lines was not big enough to permit the 1-inch sampling area for the optical measurements to be positioned to avoid overlap with the seal lines. The sample was found to have the following properties:

REFLEXITE BLAZE-ORANGE

| Average $R_a$ (cd/lux/m²) | Luminance Factor (Y) | CIE Color Coordinates |
| --- | --- | --- |
| 483 | 15.9 | 0.5963, 0.3565 |

The relatively high value for retroreflectivity is in large part due to the particular construction in which the colored film was positioned behind the substantially colorless retroreflective cube corner layer, resulting in white retroreflected light.

W-7514 Fluorescent Orange retroreflective sheeting sold by Avery-Dennison Corporation of Pasadena, Calif. was obtained. This product had a front or top retroreflective portion comprising dye(s), and a white seal film disposed behind the cube corner elements and joined to the cube corner element layer in a geometric pattern of seal lines. The geometric pattern was not big enough to permit the 1-inch sampling area for the optical measurements to be positioned to avoid overlap with these seal lines. The sample was found to have the following properties:

W-7514 FLUORESCENT ORANGE RETROREFLECTIVE SHEETING

| Average $R_a$ (cd/lux/m²) | Luminance Factor (Y) | CIE Color Coordinates |
| --- | --- | --- |
| 290 | 22.5 | 0.6247, 0.3616 |

Examples 1-4

Examples 1-4 employed HOSTASOL 3G (Yellow) fluorescent dye mixed with HOSTASOL GG (2G) (Red) fluorescent dye (except for Example 4, which employed only HOSTASOL GG (2G) (Red) fluorescent dye). The dye percentages listed are relative amounts; recall that the total amount of dye in these examples is 0.1 wt %. The measured optical properties of Examples 1-4 are summarized in Table 1.

TABLE 1

| Example No. | % Hostasol 3G | % Hostasol GG (2G) | Average Ra (cd/lux/m²) | Luminance Factor (Y) | CIE Color Coordinates |
| --- | --- | --- | --- | --- | --- |
| 1 | 30 | 70 | 646 | 33.0 | 0.6105, 0.3824 |
| 2 | 20 | 80 | 613 | 38.0 | 0.6175, 0.3741 |
| 3 | 10 | 90 | 580 | 34.8 | 0.6183, 0.3721 |
| 4 | 0 | 100 | 546 | 35.0 | 0.6168, 0.3654 |

Examples 5-6

Examples 5-6 employed HOSTASOL 3G (Yellow) fluorescent dye mixed with HOSTASOL 5B (Red) fluorescent dye. The dye percentage listed is a relative amount; recall that the total amount of dye in these examples is 0.1 wt %. The measured optical properties of these Example are summarized in TABLE 2.

TABLE 2

| Example No. | % Hostasol 3G | % Hostasol 5B | Average Ra (cd/lux/m²) | Luminance Factor (Y) | CIE Color Coordinates |
| --- | --- | --- | --- | --- | --- |
| 5 | 30 | 70 | 549 | 23.6 | 0.6100, 0.3639 |
| 6 | 20 | 80 | 524 | 22.2 | 0.6139, 0.352 |

Example 7

Example 7 employed a mixture of HOSTASOL 3G (Yellow) and LUMOGEN F 300 (Red) fluorescent dyes. The dye percentage listed is a relative amount; recall that the total amount of dye in this example is 0.1 wt %. The measured optical properties of this example are summarized in Table 3.

TABLE 3

| Example No. | % Hostasol 3G | % Lumogen F 300 | Average Ra (cd/lux/m²) | Luminance Factor (Y) | CIE Color Coordinates |
| --- | --- | --- | --- | --- | --- |
| 7 | 70 | 30 | 358 | 27.0 | 0.6188, 0.3692 |

Examples 8-11

Examples 8-11 employed a mixture of HOSTASOL 3G (Yellow) and HOSTASOL GG (2G) (Red) fluorescent dyes, and also included 0.2 weight % of a hindered amine light stabilizer (HALS) TINUVIN 770, and 0.2 weight % of a UV absorber TINUVIN 328, employed to provide dye stability and colorfastness under weathering conditions. The dye percentages listed are relative amounts; recall that the total amount of dye in these examples is 0.1 wt %. The measured optical properties of these examples are summarized in Table 4.

TABLE 4

| Example No. | Hostasol 3G (%) | Hostasol 2G (%) | Average $R_a$ (cd/lux/m$^2$) | Luminance Factor (Y) | CIE Color Coordinates |
|---|---|---|---|---|---|
| 8 | 40 | 60 | 578 | 37.2 | 0.5988, 0.3854 |
| 9 | 30 | 70 | 571 | 37.5 | 0.6082, 0.3819 |
| 10 | 20 | 80 | 610 | 34.9 | 0.6197, 0.3720 |
| 11 | 15 | 85 | 536 | 34.9 | 0.6203, 0.3701 |

Example 12

For Example 12, two dyes were compounded into the same plasticized PVC used in the previous examples, but the dyed, plasticized PVC was then calendared into a film 0.19 mm (0.0075 inches) thick. The concentration of both dyes together was 0.14 weight %, with the relative ratio of the dyes being 40% for fluorescent yellow HOSTASOL 3G and 60% for fluorescent red HOSTASOL GG (2G). A protective 0.025 mm (0.001 inch) thick urethane film, loaded with 0.88 weight % UV absorber TINUVIN 928 and with 0.88 weight % hindered amine light stabilizer (HALS) TINUVIN 292, was laminated to a front side of the dyed PVC film. Cube corner elements of the same size, geometry, and composition as those of Examples 1-11 were cast and cured onto a back side of the dyed PVC film. Finally, a white seal film was applied to the cube corner element layer in a geometric pattern of seal lines. The geometric pattern was big enough to permit the 1-inch sampling area for the optical measurements to be positioned to avoid overlap with these seal lines. The sample was found to have the following optical properties:

TABLE 5

(Example 12)

| Average $R_a$ (cd/lux/m$^2$) | Luminance Factor (Y) | CIE Color Coordinates |
|---|---|---|
| 513 | 43.1 | 0.6064, 0.379 |

As can be seen from the foregoing examples, a variety of fluorescent dye combinations can be formulated in a variety of product constructions to provide a retroreflective article having a red-orange fluorescent color as well as a good level of average retroreflectivity (at least 350 cd/(lux·m$^2$), and in many cases at least 500 cd/(lux·m$^2$)) and a good level of daytime brightness (a luminance factor Y of at least 20, and in many cases at least 30 or even 35). The dye conditions associated with such enhanced performance tend to correspond to a particular preferential color space that is disposed at the upper right portion of the overall red-orange fluorescent color space. In particular, the preferential color space is defined by CIE chromaticity coordinates (0.580, 0.384), (0.610, 0.390), (0.633, 0.366) and (0.6023, 0.360). It will be understood by those skilled in the art that changes in the compositions and concentrations of dyes, the film composition and other properties, and the product construction details from the specific examples described above can be made while still achieving the enhanced brightness and retroreflectivity properties, and the preferred color coordinates.

Although the present invention has been described with reference to preferred embodiments, workers skilled in the art will recognize that changes may be made in form and detail without departing from the spirit and scope of the invention.

What is claimed is:

1. A fluorescent red-orange retroreflective article, comprising:
    a polymeric matrix;
    at least one fluorescent dye added to the polymeric matrix in an amount sufficient to provide the article with a red-orange color under daytime lighting conditions; and
    retroreflective elements disposed to receive light that has passed through the polymeric matrix;
    wherein the article has an average retroreflectivity of at least 350 cd/(lux·m$^2$) and a luminance factor Y of at least 20.

2. The article of claim 1, wherein the article has an average retroreflectivity of at least 500 cd/(lux·m$^2$) and a luminance factor Y of at least 30.

3. The article of claim 2, wherein the article has a luminance factor Y of at least 35.

4. The article of claim 3, wherein the red-orange color has CIE chromaticity coordinates (x,y) within a color space bounded by CIE chromaticity coordinates (0.560, 0.380), (0.580, 0.355), (0.633, 0.366) and (0.610, 0.390).

5. A fluorescent red-orange retroreflective article, comprising:
    a polymeric matrix;
    at least one fluorescent dye added to the polymeric matrix in an amount sufficient to provide the article with a red-orange color under daytime lighting conditions; and
    retroreflective elements disposed to receive light that has passed through the polymeric matrix;
    wherein the red-orange color has CIE chromaticity coordinates (x,y) within a color space bounded by CIE chromaticity coordinates (0.560, 0.380), (0.580, 0.355), (0.633, 0.366) and (0.610, 0.390); and
    wherein the article has an average retroreflectivity of at least 350 cd/(lux·m$^2$) and a luminance factor Y of at least 30.

6. The article of claim 5, wherein the article has an average retroreflectivity of at least 500 cd/(lux·m$^2$) and a luminance factor Y of at least 30.

7. The article of claim 1 or claim 5, wherein the at least one fluorescent dye comprises a thioxanthene fluorescent dye.

8. The article of claim 1 or claim 5, wherein the at least one fluorescent dye comprises a mixture of fluorescent dyes added to the polymeric matrix that are selected from the group consisting of thioxanthene compounds, thioindigo compounds, and perylene compounds.

9. The article of claim 8, wherein the mixture of fluorescent dyes comprises about 0-40% of thioxanthene yellow fluorescent dye and about 60-100% of thioxanthene red fluorescent dye.

10. The article of claim 1 or claim 5, wherein the polymeric matrix is in the form of a layer having a thickness of 0.02 to 1 mm.

11. The article of claim 10, wherein the retroreflective elements comprise cube corner elements.

12. The article of claim 11, wherein the cube corner elements have air-exposed facets.

13. The article of claim 12, further comprising a white seal film disposed proximate the cube corner elements.

14. The article of claim 1 or claim 5, wherein the polymeric matrix comprises at least one of a polycarbonate, a polyester, a polyacrylate, a polymethylmethacrylate, a polyurethane, a polyolefin, and plasticized and unplasticized polyvinyl chloride (PVC).

15. The article of claim 14, wherein the polymeric matrix comprises polyvinyl chloride.

* * * * *

UNITED STATES PATENT AND TRADEMARK OFFICE
CERTIFICATE OF CORRECTION

| | | |
|---|---|---|
| PATENT NO. | : 7,396,579 B2 | |
| APPLICATION NO. | : 10/438952 | |
| DATED | : July 8, 2008 | |
| INVENTOR(S) | : Osei A. Owusu | |

It is certified that error appears in the above-identified patent and that said Letters Patent is hereby corrected as shown below:

Title Page
Item [56], Page 2, References Cited, OTHER PUBLICATIONS, Delete "Jun. 2001." and insert -- Jun. 2001, Electronic Release. --, therefor.
Item [56], Page 2, References Cited, OTHER PUBLICATIONS, Delete "Fluoresence" and insert -- Fluorescence --, therefor.

Column 2
Line 49, Delete "eminating" and insert -- emanating -- therefor.

Column 4
Line 7, Delete "[k, 1 ]" and insert -- [k, l] -- therefor.
Line 9, Delete "SB" and insert -- 5B -- therefor.

Column 7
Line 29, Delete "$R_a(cd/lux/m^2)$" and insert -- $R_A(cd/(lux \cdot m^2))$ -- therefor.
Line 50, Delete "$R_a(cd/lux/m^2)$" and insert -- $R_A(cd/(lux \cdot m^2))$ -- therefor.

Column 8
Line 39, Delete "Example" and insert -- Examples -- therefor.
Line 6, Delete "$R_a(cd/lux/m^2)$" and insert -- $R_A(cd/(lux \cdot m^2))$ -- therefor.
Line 23, Delete "$Ra(cd/lux/m^2)$" and insert -- $R_A(cd/(lux \cdot m^2))$ -- therefor.
Line 44, Delete "$Ra(cd/lux/m^2)$" and insert -- $R_A(cd/(lux \cdot m^2))$ -- therefor.
Line 63, Delete "$Ra(cd/lux/m^2)$" and insert -- $R_A(cd/(lux \cdot m^2))$ -- therefor.

UNITED STATES PATENT AND TRADEMARK OFFICE
CERTIFICATE OF CORRECTION

PATENT NO. : 7,396,579 B2
APPLICATION NO. : 10/438952
DATED : July 8, 2008
INVENTOR(S) : Osei A. Owusu It is certified that error appears in the above-identified patent and that said Letters Patent is hereby corrected as shown below:

<u>Column 9</u>
Line 17, Delete "$R_a(cd/lux/m^2)$" and insert -- $R_A(cd/(lux \cdot m^2))$ -- therefor.
Line 53, Delete "$R_a(cd/lux/m^2)$" and insert -- $R_A(cd/(lux \cdot m^2))$ -- therefor.

<u>Column 10</u>
Line 48, In Claim 5, delete "30." and insert -- 20. -- therefor.

Signed and Sealed this

Twenty-fourth Day of March, 2009

JOHN DOLL
*Acting Director of the United States Patent and Trademark Office*